United States Patent
Nishiwaki et al.

(10) Patent No.: US 7,723,403 B2
(45) Date of Patent: May 25, 2010

(54) INK-JET RECORDING PIGMENT INK

(75) Inventors: Yuko Nishiwaki, Mitaka (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 11/760,245

(22) Filed: Jun. 8, 2007

(65) Prior Publication Data

US 2007/0287769 A1      Dec. 13, 2007

(30) Foreign Application Priority Data

Jun. 12, 2006      (JP) .............................. 2006-162272

(51) Int. Cl.
  *C09D 11/00* (2006.01)
  *C08L 31/00* (2006.01)
(52) U.S. Cl. ................. 523/160; 523/161; 524/377; 524/379; 524/386; 524/388; 524/504; 524/556; 524/558
(58) Field of Classification Search ............... 523/160, 523/161; 524/377, 379, 386, 388, 556, 558, 524/504

See application file for complete search history.

(56) References Cited

U.S. PATENT DOCUMENTS

| | | | |
|---|---|---|---|
| 3,288,883 A * | 11/1966 | Temin et al. ............... 525/118 |
| 5,125,968 A | 6/1992 | Takimoto et al. ............. 106/20 |
| 5,205,861 A | 4/1993 | Matrick .................... 106/20 D |
| 5,703,270 A | 12/1997 | Nakagawa et al. ........... 560/183 |
| 6,686,413 B2 * | 2/2004 | Nakamura et al. .......... 524/553 |
| 7,338,988 B2 * | 3/2008 | Hesler et al. ................ 523/160 |
| 2004/0212667 A1 | 10/2004 | Nishiguchi .................... 347/96 |
| 2005/0075418 A1 | 4/2005 | Nishiguchi .................. 523/160 |
| 2007/0287770 A1 | 12/2007 | Nishiguchi et al. .......... 523/160 |

FOREIGN PATENT DOCUMENTS

| | | |
|---|---|---|
| JP | 3-287676 | 12/1991 |
| JP | 5-214284 | 8/1993 |
| JP | 7-285906 | 10/1995 |
| JP | 8-003500 | 1/1996 |
| JP | 8-209045 | 8/1996 |
| JP | 11-172170 | 6/1999 |
| JP | 2000-273383 | 10/2000 |
| JP | 2001-262015 | 9/2001 |

* cited by examiner

*Primary Examiner*—David Wu
*Assistant Examiner*—Marie Reddick
(74) *Attorney, Agent, or Firm*—Fitzpatrick, Cella, Harper & Scinto

(57) ABSTRACT

In an ink-jet recording pigment ink containing a pigment, water, a water-soluble solvent and a polymer, the polymer is obtained by polymerizing an alkyl-α-(hydroxyalkyl) acrylate monomer represented by the following general formula (1):

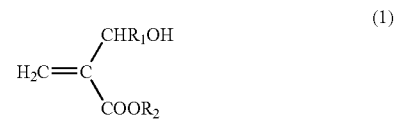

wherein $R_1$ represents a hydrogen atom or an alkyl group having 1 to 4 carbon atoms, and $R_2$ represents any one selected from a straight-chain or branched alkyl group having 1 to 18 carbon atoms, a cycloalkyl group having 4 to 6 carbon atoms and a phenyl group.

3 Claims, 3 Drawing Sheets

INK-JET RECORDING PIGMENT INK

BACKGROUND OF THE INVENTION

1. Field of the Invention

This invention relates to a pigment ink to be ejected by an ink-jet recording method. More particularly, it relates to a pigment ink which is less causative of changes in particle diameter of pigment particles and viscosity of inks and has a superior storage stability, even when left at a high temperature over a long period of time.

2. Related Background Art

Inks conventionally used in ink-jet recording have commonly been those composed chiefly of water and making use of, as coloring materials, dyes which are soluble in the chief-component water. In recent years, in order to improve weatherability of recorded images on recording mediums, it is studied to use pigments as coloring materials for ink-jet recording inks. However, since the pigments are not soluble in water base inks, the pigments must stably be dispersed in inks, e.g., by the use of dispersing agents to prevent pigment particles from agglomerating or settling. It, however, is difficult to keep such a pigment dispersed stably over a long period of time. Accordingly, as stated below, various proposals have hitherto been made in order to provide pigment inks having a superior storage stability.

For example, in Japanese Patent Application Laid-open No. H03-287676, it is proposed to use as a dispersing agent of the pigment a specific anionic surface-active agent. In Japanese Patent Application Laid-open No. H08-003500, it is also proposed to use as a dispersing agent a specific water-soluble polymer. In Japanese Patent Application Laid-open No. H05-214284, an ink-jet recording ink is disclosed in which an organic solvent is added to improve dispersion stability of the pigment. In Japanese Patent Application Laid-open No. H11-172170, a proposal is made which relates to a pigment modified with a metal compound or an organic compound. In Japanese Patent Application Laid-open No. 2000-273383, a pigment is proposed in which a water-soluble pigment derivative is adsorbed on pigment particle surfaces.

Further, as in Japanese Patent Application Laid-open No. H08-209045, a proposal is made on improvement of a process for producing a resin-dispersed pigment ink. Also, according to a proposal made in Japanese Patent Application Laid-open No. 2001-262015, the surface tension, viscosity, conductivity and pH value of an ink are controlled within specific ranges to achieve dispersion stability of the pigment ink to a certain extent.

However, in recent years, there is a tendency for the particle diameter of the pigment in ink and the diameter of nozzles through which the ink is ejected, to be made smaller in order that images formed by ink-jet recording can have a higher resolution and a higher grade. Under such circumstances, in order for the pigment ink to be stably ejected, it is necessary to improve the dispersion stability and storage stability of the pigment so that the pigment can be prevented from agglomerating or settling over a much longer period of time.

SUMMARY OF THE INVENTION

An object of the present invention is to provide a pigment ink the pigment of which has a superior dispersion stability and a superior long-term storage stability, which ink is especially useful in recent-year ink-jet recording techniques showing a tendency that the particle diameter of the pigment in ink and the diameter of nozzles through which the ink is ejected are made smaller.

The present invention is an ink-jet recording pigment ink containing a pigment, water, a water-soluble solvent and a polymer, wherein the polymer is obtained by polymerizing an alkyl-α-(hydroxyalkyl) acrylate monomer represented by the following general formula (1):

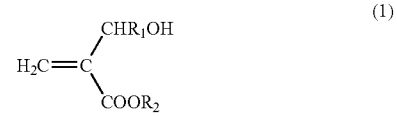

wherein $R_1$ represents a hydrogen atom or an alkyl group having 1 to 4 carbon atoms, and $R_2$ represents any one selected from a straight-chain or branched alkyl group having 1 to 18 carbon atoms, a cycloalkyl group having 4 to 6 carbon atoms and a phenyl group.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

DESCRIPTION OF THE PREFERRED EMBODIMENTS

Figure 1:
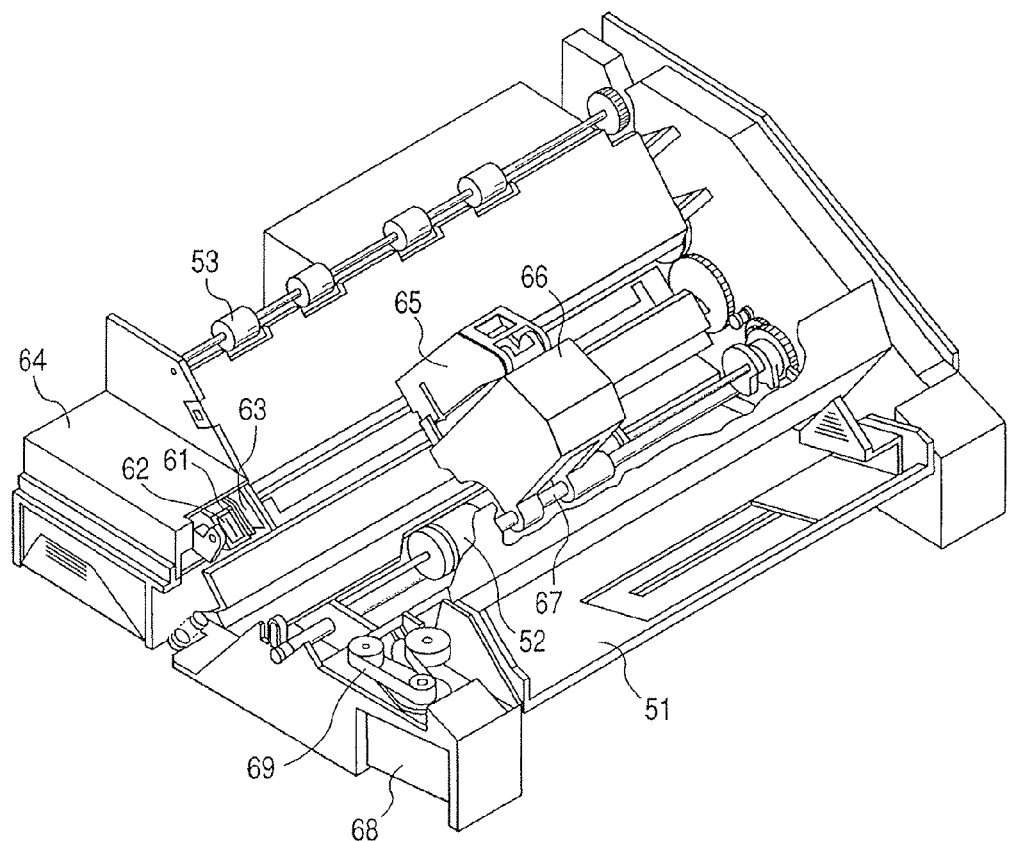
FIG. 1 is a perspective view showing an example of an ink-jet recording apparatus.

The present invention is described below in detail by giving preferred embodiments of the present invention.

The ink-jet recording pigment ink of the present invention contains a polymer obtained by polymerizing an alkyl-α-(hydroxyalkyl) acrylate monomer represented by the following general formula (1):

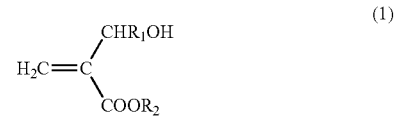

wherein $R_1$ represents a hydrogen atom or an alkyl group having 1 to 4 carbon atoms, and $R_2$ represents any one selected from a straight-chain or branched alkyl group having 1 to 18 carbon atoms, a cycloalkyl group having 4 to 6 carbon atoms and a phenyl group.

What is copolymerizable with the monomer represented by the general formula (1) may include various monomers including the following. That is, they may be any of those composed of a monomer having a hydrophobic functional group and those composed of a monomer having a hydrophilic functional group as enumerated below, as long as these are copolymerizable with the monomer represented by the general formula (1).

The monomer having a hydrophobic functional group may include the following. It may include, e.g., vinyl monomers having an aromatic functional group, such as styrene, α-methylstyrene, benzyl acrylate or methacrylate, vinyl naphthalene, 4-vinylbenzoic acid, vinyl benzoate, and N-vinylcarbazole; acrylates or methacrylates such as methyl acrylate or methacrylate, ethyl acrylate or methacrylate, butyl acrylate or methacrylate, and cyclohexyl acrylate or methacrylate; and vinyl monomers such as vinyl acetate, and ethylene oxide or propylene oxide modified products thereof.

The monomer having a hydrophilic functional group may include the following. It may include, e.g., hydrophilic monomers containing a carboxyl group, such as acrylic acid, methacrylic acid, maleic acid or anhydride, itaconic acid, and fumaric acid; monomers having a hydroxyl group, such as acrylic or methacrylic acid hydroxyalkyl esters, and monoacryl- or monomethacrylates of polyhydric alcohols such as ethylene glycol; acrylates or methacrylates of ethylene oxide or propylene oxide; acrylamide monomers such as acryl- or methacrylamide, N-methylol acryl- or methacrylamide, and N,N-dimethylaminopropyl acryl- or methacrylamide; and N-vinylacetamide and N-vinylformamide A polymer obtained by copolymerizing the monomer represented by the general formula (1) and the above monomer copolymerizable therewith may be a polymer having any form, such as a random polymer, a graft polymer or further a block polymer. As the polymer, it may preferably have weight average molecular weight in the range of from 1,000 or more to 30,000 or less, and more preferably in the range of from 3,000 or more to 15,000 or less. Such a polymer may preferably be a water-soluble polymer, and may preferably be contained in the range of from 0.1% by mass or more to 5% by mass or less in the total mass of the pigment ink.

In the present invention, a polymer may be used as a dispersing agent with which the pigment used is to be dispersed. Such a pigment-dispersing polymer may include the following, any of which may be used as long as it can disperse the pigment. For example, an acrylic polymer, a polyamide polymer, a polyester polymer, a polypeptide, cellulose or a modified product thereof, polyvinyl alcohol, a polyolefin or the like may be used as the pigment-dispersing polymer. This polymer may also have any form, such as a random polymer, a graft polymer or further a block polymer. Such a polymer may preferably have weight average molecular weight in the range of from 1,000 or more to 30,000 or less, and more preferably in the range of from 3,000 or more to 15,000 or less.

In the present invention, it is particularly preferable that the polymer obtained by polymerizing the above alkyl-α-(hydroxyalkyl) acrylate monomer represented by the general formula (1) is used as the pigment-dispersing polymer. More specifically, the use of such a copolymer enables physical adsorption and hydrogen bonding to take place between the pigment and the polymer at their adjoining moieties. Thus, the use of the polymer in the present invention as the pigment-dispersing polymer brings strong adsorption of the polymer to the pigment to enable improvement in storage stability of the pigment ink.

The pigment particle surfaces are generally hydrophobic, and hence the adsorption of the polymer to the pigment in a water base ink is predominantly the physical adsorption that is due to hydrophobic mutual action between hydrophobic moieties of the pigment and hydrophobic moieties in the polymer structure. However, hydrophilic functional groups are also present in the pigment in a small quantity, and hence the pigment particle surfaces have hydrophilic properties in part. This enables the pigment to form hydrogen bonds or ionic bonds between the pigment and the hydrophilic moieties in the polymer. Thus, in the polymer in which the monomer having a structure wherein a hydrophobic alkyl group and a hydrophilic hydroxyl group adjoin each other in the molecule as represented by the general formula (1) has been introduced, the physical adsorption due to hydrophobic mutual action and the hydrogen bonding are considered to take place between the pigment and the polymer at their adjoining moieties. Hence, the use of the polymer obtained by copolymerizing the monomer having the above structure can enhance the adsorptive force of the polymer to the pigment and moreover has enabled improvement in storage stability of the pigment ink, as so considered.

As stated previously, the copolymer having the above structure may be the polymer having any form, such as a random polymer, a graft polymer or further a block polymer. In particular, it may preferably be a graft polymer. Of the graft polymer, it may more preferably have a structure wherein one of the main chain and the side chain is hydrophobic and the other of them is hydrophilic. The hydrophobic moiety in the polymer has the function to come adsorbed on the hydrophobic pigment particle surfaces and the hydrophilic moiety in the polymer having a high affinity for aqueous solvents has the function to spread in the solvent to provide the pigment particles with repulsion force. Hence, as long as the polymer is such a graft polymer as stated above, the hydrophobic moiety and the hydrophilic moiety are clearly separate from each other to enable the hydrophobic moiety and the hydrophilic moiety to bring out their respective functions.

Especially where the polymer is used in a water base pigment ink as in the present invention, it is preferable to use a graft polymer the main chain of which is hydrophobic and the side chain of which is hydrophilic. The polymer having such a structure may be incorporated in the water base pigment ink, where the hydrophobic main chain moiety of the polymer comes closely adsorbed on the pigment particle surfaces, or the hydrophilic side chain moiety thereof spreads efficiently in the aqueous solvent to provide the pigment particles with a greater repulsion force, as so considered. As the result, this enables the pigment ink to be more improved in dispersion stability.

To form the monomer for forming the hydrophobic moiety, at least one monomer may be selected from the group of monomers having a hydrophobic functional group which have been enumerated above. To form the other monomer for forming the hydrophilic moiety, at least one monomer may be selected from the group of monomers having a hydrophilic functional group which have been enumerated above.

In the foregoing, the monomer used to form the hydrophobic moiety of the graft polymer may be incorporated with the above hydrophilic monomer as long as the latter does not obstruct the former's hydrophobic properties. However, a case in which the hydrophobic monomer for forming the hydrophobic moiety is in a too small proportion is undesirable because the graft polymer formed can not come adsorbed on the hydrophobic pigment particles to make them dispersed insufficiently and the ink may have low dispersion stability and ejection stability. Accordingly, it is preferable for the graft polymer used in the present invention that the hydrophobic monomer for forming the hydrophobic moiety is in a proportion of 60% by mass or more of the whole monomer for forming the hydrophobic moiety.

In the monomer used to form the hydrophilic moiety of the graft polymer, the hydrophobic monomer as exemplified above may be used as long as the latter does not obstruct the former's hydrophilic properties. However, a case in which the hydrophilic monomer constituting the hydrophilic moiety of the graft polymer is in a small proportion may make the polymer itself have a low solubility in the aqueous medium, so that a pigment dispersion has a low dispersion stability in the aqueous medium. In such a case, the ejection stability of the pigment ink is damaged when the ink is ejected from an ink-jet recording head by applying heat energy to the ink to make it bubble. Accordingly, it is preferable for the graft polymer used in the present invention to be such a polymer that the hydrophilic monomer constituting the hydrophilic moiety is in a proportion of 60% by mass or more of the whole hydrophilic moiety.

The graft polymer used in the present invention may preferably be a polymer the side chain of which has weight average molecular weight in the range of from 300 or more to 4,000 or less and in which the ratio of weight average molecular weight of the whole polymer to weight average molecular weight of the side chain is in the range of from 1.2:1 to 20:1. In addition, where the pigment is dispersed using a polymer having an ionic group, electrical double layers due to the polymer are formed in the water to enhance dispersion stability in virtue of electrostatic repulsion force. Hence, the polymer used in the present invention may preferably be a polymer having an ionic group in its structure. Here, the ionic group may include a carboxyl group, a sulfone group, a sulfino group and a phosphino group. Any of these ionic groups may preferably be in such a content that the polymer may have acid value in the range of from 50 mgKOH or more to 300 mgKOH or less. That is, the use of a polymer having an acid value of more than 300 mgKOH is undesirable because the fluid pigment dispersion has so high viscosity as to come poorly ejected or the pigment dispersion has so high affinity for the water that printed images may have a low water resistance. Here, the weight average molecular weight and acid value of the polymer in the present invention may be measured by conventional methods.

The alkyl-α-(hydroxyalkyl) acrylate monomer that characterizes the present invention may preferably be one for forming the hydrophobic main chain of the graft polymer. The alkyl-α-(hydroxyalkyl) acrylate in the polymer may preferably be in such a proportion that it is contained in an amount of 15% by mass or less in the monomer, the constituent material of the polymer. Most pigment particle surfaces are hydrophobic, and hence, if the above monomer is contained in the polymer in a too large quantity, the polymer may have too many hydrophilic moieties, resulting in insufficient physical adsorption on the pigment.

In the present invention, the polymer as described above which is used as a dispersing agent of the pigment may preferably be contained in the range of from 0.1% by mass or more to 15% by mass or less based on the total mass of the pigment ink. Such a pigment-dispersing polymer may optionally be used in combination of a plurality of polymers, or may be of a different type depending on the pigment used.

A base may be added in order to well disperse the pigment-dispersing polymer in the aqueous medium. The base usable here may include organic amines such as ammonia, monoethanolamine, diethanolamine, triethanolamine, amine methylpropanol, and N,N-dimethylethanolamine; and alkali metal hydroxides such as potassium hydroxide and sodium hydroxide; any of which may preferably be used.

To the pigment ink of the present invention, a water-soluble polymer may optionally be added in addition to the above pigment-dispersing polymer. The water-soluble polymer usable here may include acrylic or methacrylic polymers, polyamide polymers, polyester polymers, polypeptides, cellulose and modified products thereof, polyvinyl alcohol, and polyolefins. Any of these polymers may preferably be added in substantially the same amount as the above pigment-dispersing polymer or in a proportion not more than that. Such a base as described above may further be added in order to improve the solubility of these water-soluble polymers.

The ink-jet recording pigment ink (herein also "ink" or "pigment ink") of the present invention contains the copolymer having the specific structure as described above. Besides, it contains a pigment, water and a water-soluble solvent. The pigment used in the present invention may be any of inorganic and organic pigments. The pigment may be used in the range of from 1% by mass or more to 20% by mass or less, and preferably from 2% by mass or more to 12% by mass or less, in mass ratio, based on the total mass of the ink.

The pigment used in the present invention may specifically include carbon black as a black pigment. For example, what may preferably be used is carbon black produced by the furnace method or channel method and one having the following physical properties. That is, what may preferably be used is carbon black having a DBP oil absorption of from 40 to 200 ml/100 g, a primary particle diameter of from 1 to 40 millimicrons (nm), a BET method specific surface area of from 50 $m^2/g$ to 400 $m^2/g$, a volatile content of from 0.5% to 10%, and a pH value of from 2 to 9. As commercially available products having such properties, usable are, e.g., No. 2300, No. 900, No. 950, MCF-88, No. 33, No. 40, No. 45, No. 52, MA7, MA8, and No. 2200B (all available from Mitsubishi Chemicals, Inc.); RAVEN 1255 (available from Columbian Carbon Japan Limited); REGAL 400R, REGAL 330R, REGAL 660R, and MOGUL L (all available from Cabot Corp.); COLOR BLACK FW1, COLOR BLACK FW285, COLOR BLACK FW18, COLOR BLACK S170, COLOR BLACK S160, HIBLACK 900, HIBLACK 890, PRINTEX 35, and PRINTEX U (all available from Degussa Corp.); any of which may preferably be used.

A yellow pigment may include, e.g., C.I. Pigment Yellow 1, 2, 3, 13, 16, 74, 83, 110 and 128. A magenta pigment may include, e.g., C.I. Pigment Red 5, 7, 12, 48 (Ca), 48 (Mn), 57 (Ca), 112 and 122. A Cyan pigment may include, e.g., C.I. Pigment Blue 1, 2, 3, 15:3, 15:4, 15:6, 16 and 22. It may also include C.I. Vat Blue 4 and 6. Of course, in the present invention, examples are by no means limited to these. Besides the foregoing, pigments produced newly may of course be used.

The pigment ink of the present invention contains a mixed solvent of water and a water-soluble solvent. These are described here. As the water used in the present invention, it is preferable to use not usual water, which contains various ions, but ion-exchanged water (deionized water). The water-soluble solvent used in the form of a mixture with the water may include the following organic solvents. It may include, e.g., alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and diethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol monomethyl (or ethyl) ether, diethylene glycol methyl (or ethyl) ether and triethylene glycol monomethyl (or ethyl) ether; and N-methyl-2-pyrrolidone, 2-pyrrolidone, and 1,3-dimethyl-2-imidazolidinone. Of these many water-soluble organic solvents, particularly preferred are polyhydric alcohols such as diethylene glycol, and lower alkyl ethers of polyhydric alcohols, such as triethylene glycol monomethyl (or ethyl) ether.

Such a water-soluble organic solvent as described above may preferably be contained in the ink commonly in the range of from 3% by mass or more to 50% by mass or less, and particularly preferably in the range of from 3% by mass or more to 40% by mass or less, based on the total mass of the ink. The water to be used may preferably be in a content of from 10% by mass or more to 90% by mass or less, and particularly preferably from 30% by mass or more to 80% by mass or less, based on the total mass of the ink.

The ink-jet recording pigment ink of the present invention may preferably be one having been adjusted to be neutral or alkaline, as the whole ink. As long as the ink thus adjusted is used, the repulsion force due to Coulomb interaction can act between fine pigment particles to enhance the dispersion stability. Hence, the ink can be a pigment ink having much superior long-term storage stability. If, however, the ink is too strongly alkaline, such an ink may cause corrosion of various members used in ink-jet recording apparatus, and hence may preferably have a pH value in the range of from 7 to 10.

As the ink of the present invention, in addition to the above components, a surface-active agent, an anti-foaming agent, an anticeptic and so forth may be added in order to make the ink have any desired physical properties as occasion calls. In particular, a surface-active agent which functions as a penetration accelerator may preferably be added in a quantity proper enough to take a role in making liquid components of the ink penetrate quickly into recording mediums. It may be added in an amount of from 0.05% by mass or more to 10% by mass or less, and particularly preferably from 0.5% by mass or more to 5% by mass or less. As examples of an anionic surface-active agent, any agents commonly available may preferably be used, such as those of a carboxylate type, a sulfuric ester type, a sulfonate type and a phosphoric ester type.

How to produce the ink of the present invention, having such components as described above, is described below. First, the pigment is added to an aqueous medium prepared by mixing at least the pigment-dispersing polymer and the water, and these are mixed and stirred, followed by dispersion using a dispersing means described later, and then optionally classification treatment to remove coarse particles, such as centrifugal treatment, to obtain a desired fluid pigment dispersion. Next, to the fluid pigment dispersion obtained, the water-soluble solvent and such additive components as exemplified above which have appropriately been selected are added, followed by stirring to make up the pigment ink of the present invention.

Where the pigment-dispersing polymer does not dissolve completely in an aqueous alkali solution, a base may be added in order to improve affinity for the aqueous medium. The base usable here may include the following. For example, preferably usable are organic amines such as monoethanolamine, diethanolamine, triethanolamine, amine methylpropanol, and ammonia; and inorganic bases such as potassium hydroxide and sodium hydroxide. A water-soluble solvent capable of dissolving the pigment-dispersing polymer may also be added to the aqueous medium in order to make the pigment-dispersing polymer dissolve in the aqueous medium.

Here, the water-soluble solvent that may be used may be any of those capable of dissolving the pigment-dispersing polymer. Stated specifically, it may include the following. For example, preferably usable are lower alcohols such as methanol, ethanol, 1-propanol and 2-propanol; glycols such as diethylene glycol and dipropylene glycol; glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, and dipropylene glycol monoethyl ether; ketones such as methyl ethyl ketone; and cyclic ethers such as tetrahydrofuran Any of these water-soluble solvents may previously be mixed with a solvent which contains ion-exchanged water or the like, and thereafter may dissolve the pigment-dispersing polymer. Instead, the pigment-dispersing polymer may previously be dissolved in any of these water-soluble solvents, and thereafter the resultant solution may be mixed with the solvent which contains ion-exchanged water or the like. In producing the pigment ink, which contains the pigment, it is effective to stir the aqueous medium containing the pigment, to carry out premixing for 30 minutes or more before the dispersion treatment. That is, such premixing operation is preferable because the wettability of pigment particle surfaces can be improved to help the dispersing agent to come adsorbed on the pigment particle surfaces.

A dispersion machine used in the above dispersion treatment of the pigment may be any of dispersion machines used commonly in the art. It may include, e.g., a ball mill, a roll mill, a sand mill and Nanomizer (trade name). In particular, a high-speed type sand mill may preferably be used. Such a mill may include, e.g., Super mill, Sand grinder, Beads mill, Agitator mill, Grain mill, Dyno mill, Pearl mill and Koboru mill (all trade names).

In the ink-jet recording, clogging tends to occur when pigment inks are used, which contain pigments as in the present invention. Accordingly, when pigment inks are used, inks are ejected at a low speed because of a demand for anti-clogging properties and so forth. In preparing pigment inks to be used, it is desired to use pigments having an optimum particle size distribution. Accordingly, also in preparing the ink of the present invention, it is preferable to use pigments having an appropriate particle size distribution. As methods for obtaining pigments having the desired particle size distribution, the following methods are available. That is, the methods are to make pulverization media of the dispersion machine have a small size, to use pulverization media at a high packing, to carry out treatment for a longer time, to carry out classification by means of a filter or a centrifuge after pulverization, and to use any of these methods in combination.

<Ink-Jet Recording Method and Apparatus>

A recording apparatus usable in the ink-jet recording in the present invention is described next. As a recording apparatus preferable for recording images by using the ink of the present invention, an apparatus is available in which thermal or mechanical energy corresponding to recording signals is applied to the ink, which is held in a chamber of a recording head having an ink holder holding therein the ink, to cause ink droplets to form by the aid of that energy.

FIG. 1 shows an example of an ink-jet recording apparatus in which such a recording head is kept set. In FIG. 1, reference numeral 61 denotes a blade serving as a wiping member, which is in the form of a cantilever one end of which is a stationary end retained by a blade-retaining member. The blade 61 is provided at the position adjacent to the region in which a recording head makes a record. In the example shown in FIG. 1, the blade 61 is retained in such a form that it projects to the course through which the recording head is moved. Reference numeral 62 denotes a cap, which is provided at the home position adjacent to the blade 61, and is so constructed that it moves in the direction perpendicular to the direction in which the recording head is moved, and comes into contact with an ink ejection orifice face to perform capping. Further, reference numeral 63 in FIG. 1 denotes an ink absorber provided adjoiningly to the blade 61, and, like the blade 61, is retained in such a form that it projects to the course through which the recording head is moved.

The above blade 61, cap 62 and absorber 63 constitute an ejection restoration assembly 64, where the blade 61 and the absorber 63 remove water, dust, dirt and so forth from the ink ejection orifice face. Reference numeral 65 denotes the recording head, having an ejection energy generating means and ejects ink to a recording medium set oppositely to the ejection orifice face provided with ejection orifices, to perform recording. Reference numeral 66 denotes a carriage on which the recording head 65 is mounted so that the recording head 65 can be moved. The carriage 66 is slidably associated with a guide shaft 67. Part of the carriage 66 is connected with a belt 69 driven by a motor 68. Thus, the carriage 66 can be moved along the guide shaft 67 and hence the recording head 65 can be moved from a recording region to a region adjacent thereto.

Reference numeral 51 denotes a feeding part through which recording mediums are to be sheet by sheet inserted, and 52, a paper feed roller driven by a motor (not shown). With such construction, a recording medium is fed to the position opposing to the ejection orifice face of the recording head, and, with progress of recording, put out to a paper delivery section provided with paper delivery rollers 53.

In the above construction, the cap 62 of the ejection restoration assembly 64 is receded from the moving course of the recording head 65 when the recording head 65 is returned to its home position after completion of recording, and the blade 61 stands projected to the moving course. As the result, the ejection orifice face of the recording head 65 is wiped. Incidentally, when the cap 62 comes into contact with the ejection orifice face of the recording head 65 to perform capping, the cap 62 is moved in such a way that it projects to the moving course of the recording head.

When the recording head 65 is moved from its home position to the position at which the recording is started, the cap 62 and the blade 61 are at the same position as the above position where the ejection orifice face is wiped. As the result, the ejection orifice face of the recording head 65 is wiped also at the time of this movement. The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection orifice face is wiped in accordance with this movement.

Figure 2:
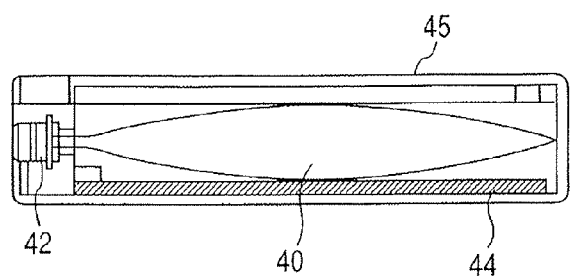
FIG. 2 is a vertical section of an ink cartridge.

FIG. 2 is a sectional view showing an example of an ink cartridge 45 holding therein the ink being fed to the recording head through an ink-feeding member, e.g., a tube. Here, reference numeral 40 denotes an ink holder, e.g., an ink bag, which holds therein the feeding ink. The top thereof is provided with a stopper 42 made of rubber. A needle (not shown) may be inserted to this stopper 42 so that the ink in the ink bag 40 can be fed to the head. Reference numeral 44 denotes an absorber that receives a waste ink.

Figure 3:
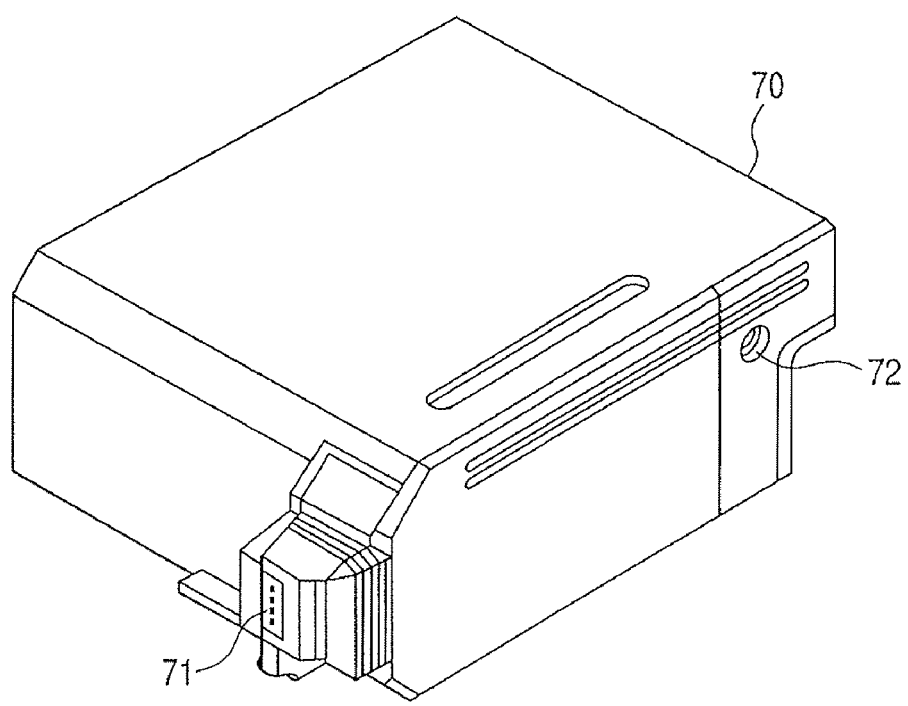
FIG. 3 is a perspective view of a recording unit.

The ink-jet recording apparatus used in the present invention is not limited to the apparatus as described above, in which the head and the ink cartridge are separately provided, and is preferably usable also in a device in which these are integrally formed as shown in FIG. 3. In FIG. 3, reference numeral 70 denotes a recording unit, in the interior of which an ink holder is received which holds therein an ink, e.g., an ink absorber. The recording unit is so constructed that the ink in such an ink absorber is ejected in the form of ink droplets from a head 71 having a plurality of orifices. Reference numeral 72 denotes an air path opening through which the interior of the cartridge is made to communicate with the atmosphere. This recording unit 70 is one used in place of the recording head 65 shown in FIG. 1, and is detachably mountable to the carriage 66.

Figure 4:
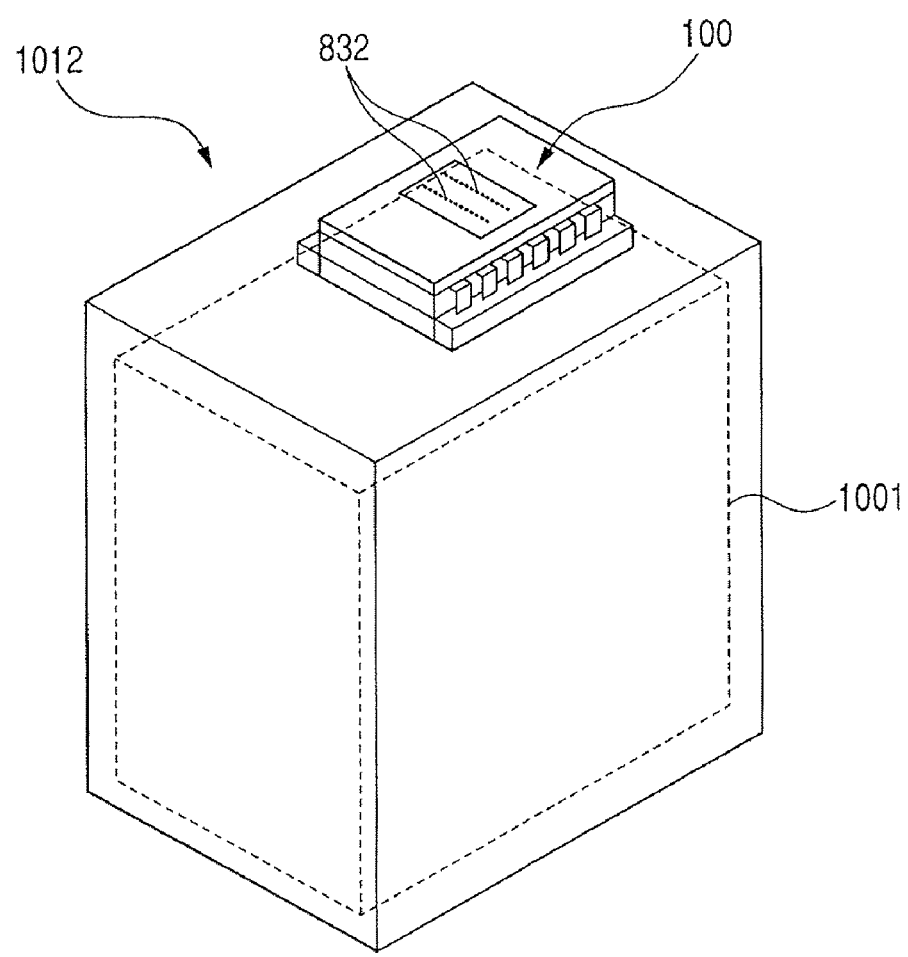
FIG. 4 is a perspective view showing an example of an ink cartridge having a liquid-ejecting head.

FIG. 4 shows an example of an ink-jet cartridge mountable to the above ink-jet recording apparatus. A cartridge 1012 in this example is a cartridge of a serial type, which is chiefly constituted of an ink-jet recording head 100 and a liquid-holding tank 1001 which holds therein a liquid such as the ink. In the ink-jet recording head 100, a large number of ejection orifices 832 for ejecting the liquid therefrom are formed. It is so designed that the liquid such as the ink is led from the liquid-holding tank 1001 to a common liquid-holding chamber of the ink-jet recording head 100 via liquid-feeding channels (not shown). The cartridge 1012 shown in FIG. 4 is so set up that the ink-jet recording head 100 and the liquid-holding tank 1001 are integrally formed and the liquid-holding tank 1001 can optionally be replenished therein with the liquid. Instead, the liquid-holding tank 1001 may also be so designed as to employ a structure wherein the liquid-holding tank 1001 is exchangeably connected to the ink-jet recording head 100.

EXAMPLES

The present invention is described below in greater detail by giving Examples, to which the present invention is by no means limited. In the following, what is indicated as "part(s)" refers to "part(s) by mass" unless particularly noted. Ethyl-α-(hydroxymethyl) acrylate used in Examples, which is an alkyl-α-(hydroxyalkyl) acrylate monomer, is one available from Nippon Shokubai Co., Ltd. Also, n-butyl-α-(hydroxyethyl) acrylate monomer is one synthesized according to the method disclosed in Japanese Patent Application Laid-open No. H07-285906.

Example 1

First, Random Polymers R1 and R2 to be used in Example 1 were synthesized in the following way.

Synthesis of Random Polymer R1

18 parts of 2-hydroxyethyl acrylate, 57 parts of n-butyl methacrylate and 25 parts of methacrylic acid were used as synthesis materials for Random Polymer R1. Using these monomers, these were reacted in 500 parts of 1-methoxy-2-propanol at 75° C. for 2 hours in a stream of $N_2$ and using azobisisobutylonitrile as an initiator. The reaction product obtained was developed in 1,000 parts of hexane to remove unreacted products by precipitation purification, followed by drying under reduced pressure to obtain Random Polymer R1. This Random Polymer R1 had a weight average molecular weight of 7,800 and an acid value of 157 mgKOH/g.

Synthesis of Random Polymer R2

Random Polymer R2 was obtained in the same manner as in the synthesis of Random Polymer R1 except that, in place of 18 parts of 2-hydroxyethyl acrylate, 57 parts of n-butyl methacrylate and 25 parts of methacrylic acid used therein, the following materials were used. That is, the polymerization was carried out using as synthesis materials 24 parts of ethyl-α-(hydroxymethyl) acrylate, 48 parts of benzyl acrylate and 28 parts of acrylic acid. Random Polymer R2 obtained had a weight average molecular weight of 8,200 and an acid value of 196 mgKOH/g.

Preparation of Fluid Pigment Dispersion PK1

Using Random Polymer R1 obtained as described above, Fluid Pigment Dispersion PK1 was prepared by the following formulation and procedure.

| | |
|---|---|
| Random Polymer R1 | 15 parts |
| Propylene glycol monomethyl ether | 50 parts |
| Ion-exchanged water | 200 parts |
| Potassium hydroxide | 1 part |

The above components were mixed and resin contents were completely dissolved. Thereafter, 30 parts of carbon black (COLOR BLACK FW18, available from Degussa Corp.) was added to the solution obtained, and these were premixed for 30 minutes, followed by dispersion treatment carried out under the following conditions.

Dispersion machine: Sand grinder (manufactured by Igarashi Kikai).

Pulverizing media: Zirconium beads (1 mm in diameter).

Packing of pulverizing media: 75% (by volume).

Pulverization time: 3 hours.

Solid matter was separated from solvent matter by aciding-out. To the solid matter separated, 1% by mass of an aqueous KOH solution was so added as to be in a solid matter concentration of 15% by mass, to obtain Fluid Pigment Dispersion PK1.

Preparation of Fluid Pigment Dispersions PC1, PM1 & PY1

Fluid Pigment Dispersions PC1, PM1 and PY1 were obtained in the same manner as in the preparation of Fluid Pigment Dispersion PK1 except that the carbon black (COLOR BLACK FW18, available from Degussa Corp.) used therein was changed for the following pigments, respectively. That is, C.I. Pigment Blue 15:3 was used to prepare Fluid Pigment Dispersion PC1, C.I. Pigment Red 122 was used to prepare Fluid Pigment Dispersion PM1 and C.I. Pigment Yellow 74 was used to prepare Fluid Pigment Dispersion PY1.

Preparation of Pigment Ink K1

The following components were mixed to prepare Pigment Ink K1 by a conventional method.

| | |
|---|---|
| Fluid Pigment Dispersion PK1 | 30 parts |
| Random Polymer R2 | 2 parts |
| Glycerol | 5 parts |
| Diethylene glycol | 5 parts |
| Isopropyl alcohol | 5 parts |
| ACETYLENOL EH | 1 part |
| (available from Kawaken Fine Chemicals Co., Ltd.) | |
| Ion-exchanged water | 52 parts |

Preparation of Pigment Inks C1, M1 & Y1

Pigment Inks C1, M1 and Y1 were obtained in the same manner as in the preparation of Pigment Ink K1 except that Fluid Pigment Dispersions PC1, PM1 and PY1, respectively, were used in place of Fluid Pigment Dispersion PK1.

Example 2

Preparation of Fluid Pigment Dispersion PK2

Fluid Pigment Dispersion PK2 was obtained in the same manner as in Example 1 except that, in the preparation of Fluid Pigment Dispersion PK1 in Example 1, Random Polymer R2 prepared as described above was used in place of Random Polymer R1.

Preparation of Fluid Pigment Dispersions PC2, PM2 & PY2

Fluid Pigment Dispersions PC2, PM2 and PY2 were obtained in the same manner as in the preparation of Fluid Pigment Dispersion PK2 except that the carbon black (COLOR BLACK FW18, available from Degussa Corp.) used therein was changed for the following pigments, respectively. That is, C.I. Pigment Blue 15:3 was used to prepare Fluid Pigment Dispersion PC2, C.I. Pigment Red 122 was used to prepare Fluid Pigment Dispersion PM2 and C.I. Pigment Yellow 74 was used to prepare Fluid Pigment Dispersion PY2.

Preparation of Pigment Ink K2

The following components were mixed to prepare Pigment Ink K2 by a conventional method.

| | |
|---|---|
| Fluid Pigment Dispersion PK2 | 30 parts |
| Glycerol | 5 parts |
| Diethylene glycol | 5 parts |
| Isopropyl alcohol | 5 parts |
| ACETYLENOL EH | 1 part |
| (available from Kawaken Fine Chemicals Co., Ltd.) | |
| Ion-exchanged water | 54 parts |

Preparation of Pigment Inks C2, M2 & Y2

Pigment Inks C2, M2 and Y2 were obtained in the same manner as in the preparation of Pigment Ink K2 except that Fluid Pigment Dispersions PC2, PM2 and PY2, respectively, were used in place of Fluid Pigment Dispersion PK2.

Example 3

First, Random Polymer R3 to be used in Example 3 was synthesized in the following way.

Synthesis of Random Polymer R3

Random Polymer R3 was obtained in the same manner as in the synthesis of Random Polymer R1 in Example 1, except that, in place of 18 parts of 2-hydroxyethyl acrylate, 57 parts of n-butyl methacrylate and 25 parts of methacrylic acid used therein, the following materials were used. That is, Random Polymer R3 was synthesized using 14 parts of n-butyl-α-(hydroxyethyl) acrylate, 56 parts of ethyl methacrylate and 30 parts of methacrylic acid. This Random Polymer R3 had a weight average molecular weight of 7,700 and an acid value of 189 mgKOH/g.

Preparation of Fluid Pigment Dispersion PK3

Fluid Pigment Dispersion PK3 was obtained in the same manner as in Example 1 except that, in the preparation of Fluid Pigment Dispersion PK1 in Example 1, Random Polymer R3 synthesized as described above was used in place of Random Polymer R1.

Preparation of Fluid Pigment Dispersions PC3, PM3 & PY3

Fluid Pigment Dispersions PC3, PM3 and PY3 were obtained in the same manner as in the preparation of Fluid Pigment Dispersion PK3 except that the carbon black (COLOR BLACK FW18, available from Degussa Corp.) used therein was changed for the following pigments, respectively. That is, C.I. Pigment Blue 15:3 was used to prepare Fluid Pigment Dispersion PC3, C.I. Pigment Red 122 was used to prepare Fluid Pigment Dispersion PM3 and C.I. Pigment Yellow 74 was used to prepare Fluid Pigment Dispersion PY3.

Preparation of Pigment Inks K3, C3, M3 & Y3

Pigment Inks K3, C3, M3 and Y3 were obtained in the same manner as in Example 2 except that, in the preparation of Pigment Ink K2 in Example 2, Fluid Pigment Dispersions PK3, PC3, PM3 and PY3, respectively, were used in place of Fluid Pigment Dispersion PK2.

Example 4

Graft Polymer G1 to be used in Example 4 was synthesized in the following way. First, Macromonomer 1 to be used to synthesize Graft Polymer G1 was synthesized, and this monomer was used to obtain Graft Polymer G1.

Synthesis of Macromonomer M1

To synthesize Macromonomer M1, 10 parts of α-methylstyrene dimer, 30 parts of acrylic acid, 12 parts of n-butyl methacrylate and 8 parts of n-butyl-α-(hydroxyethyl) acrylate were used. Then, these materials were dropwise added to 500 parts of 1-methoxy-2-propanol over a period of 3 hours at a polymerization temperature of 75° C. and in a stream of $N_2$. Here, azobisisobutylonitrile was used as a polymerization initiator. After they were dropwise added, the system was kept at 75° C. for 2 hours. The reaction product obtained was developed in 1,000 parts of hexane to remove unreacted products by precipitation purification, followed by drying under reduced pressure to obtain Macromonomer M1. This Macromonomer M1 had a weight average molecular weight of 650.

Synthesis of Graft Polymer G1

To synthesize Graft Polymer G1, 30 parts as solid content, of Macromonomer M1 obtained as described above, 6 parts of acrylic acid, 52 parts of benzyl acrylate and 12 parts of n-butyl-α-(hydroxyethyl) acrylate were used. Using these materials, these were reacted in 500 parts of 1-methoxy-2-propanol at 75° C. for 2 hours in a stream of $N_2$ and using azobisisobutylonitrile as an initiator. Then, the reaction product obtained was developed in 1,000 parts of hexane to remove unreacted products by precipitation purification, followed by drying under reduced pressure to obtain Graft Polymer G1. This Graft Polymer G1 had a weight average molecular weight of 7,600 and an acid value of 171 mgKOH/g.

Preparation of Fluid Pigment Dispersion PK4

Fluid Pigment Dispersion PK4 was obtained in the same manner as in Example 1 except that, in the preparation of Fluid Pigment Dispersion PK1 in Example 1, Graft Polymer G1 synthesized as described above was used in place of Random Polymer R1.

Preparation of Fluid Pigment Dispersions PC4, PM4 & PY4

Fluid Pigment Dispersions PC4, PM4 and PY4 were obtained in the same manner as in the preparation of Fluid Pigment Dispersion PK4 except that the carbon black (COLOR BLACK FW18, available from Degussa Corp.) used therein was changed for the following pigments, respectively. That is, C.I. Pigment Blue 15:3 was used to prepare Fluid Pigment Dispersion PC4, C.I. Pigment Red 122 was used to prepare Fluid Pigment Dispersion PM4 and C.I. Pigment Yellow 74 was used to prepare Fluid Pigment Dispersion PY4.

Preparation of Pigment Inks K4, C4, M4 & Y4

Pigment Inks K4, C4, M4 and Y4 were obtained in the same manner as in Example 2 except that, in the preparation of Pigment Ink K2 in Example 2, Fluid Pigment Dispersions PK4, PC4, PM4 and PY4, respectively, were used in place of Fluid Pigment Dispersion PK2.

Example 5

Synthesis of Macromonomer M2

Macromonomer M2 was obtained in the same manner as in the synthesis of Macromonomer M1 in Example 4, except that, in place of 10 parts of α-methylstyrene dimer, 30 parts of acrylic acid, 12 parts of n-butyl methacrylate and 8 parts of n-butyl-α-(hydroxyethyl) acrylate used therein, the following synthesizing materials were used. That is, Macromonomer M2 was obtained in the same manner as in the synthesis of Macromonomer M1 except that 10 parts of α-methylstyrene dimer, 40 parts of acrylic acid and 9 parts of ethyl-α-(hydroxymethyl) acrylate were used as the materials. This Macromonomer M2 had a weight average molecular weight of 720.

Synthesis of Graft Polymer G2

Graft Polymer G2 was obtained in the same manner as in the synthesis of Graft Polymer G 1 in Example 4, except that, in place of 30 parts as solid content, of Macromonomer M1, 6 parts of acrylic acid, 52 parts of benzyl acrylate and 12 parts of n-butyl-α-(hydroxyethyl) acrylate used therein, the following synthesizing materials were used. That is, Graft Polymer G2 was obtained in the same manner as in Example 4 except that 26 parts as solid content, of Macromonomer M2, 10 parts of n-butyl acrylate, 48 parts of benzyl acrylate and 16 parts of ethyl-α-(hydroxymethyl) acrylate were used. The Graft Polymer G2 obtained had a weight average molecular weight of 6,700 and an acid value of 159 mgKOH/g.

Preparation of Fluid Pigment Dispersion PK5

Fluid Pigment Dispersion PK5 was obtained in the same manner as in Example 1 except that, in the preparation of Fluid Pigment Dispersion PK1 in Example 1, Graft Polymer G2 obtained as described above was used in place of Random Polymer R1.

Preparation of Fluid Pigment Dispersions PC5, PM5 & PY5

Fluid Pigment Dispersions PC5, PM5 and PY5 were obtained in the same manner as in the preparation of Fluid Pigment Dispersion PK5 except that the carbon black (COLOR BLACK FW18, available from Degussa Corp.) used therein was changed for the following pigments, respectively. That is, C.I. Pigment Blue 15:3 was used to prepare Fluid Pigment Dispersion PC5, C.I. Pigment Red 122 was used to prepare Fluid Pigment Dispersion PM5 and C.I. Pigment Yellow 74 was used to prepare Fluid Pigment Dispersion PY5.

Preparation of Pigment Inks K5, C5, M5 & Y5

Pigment Inks K5, C5, M5 and Y5 were obtained in the same manner as in Example 2 except that, in the preparation of Pigment Ink K2 in Example 2, Fluid Pigment Dispersions PK5, PC5, PM5 and PY5, respectively, were used in place of Fluid Pigment Dispersion PK2.

Example 6

Synthesis of Macromonomer M3

Macromonomer M3 was obtained in the same manner as in the synthesis of Macromonomer M1 in Example 4, except that, in place of 10 parts of α-methylstyrene dimer, 30 parts of acrylic acid, 12 parts of n-butyl methacrylate and 8 parts of n-butyl-α-(hydroxyethyl) acrylate used therein, the following synthesizing materials were used. That is, Macromonomer M3 was obtained in the same manner as in Example 4 except that 10 parts of α-methylstyrene dimer, 45 parts of acrylic acid and 5 parts of ethyl methacrylate were used. This Macromonomer M3 had a weight average molecular weight of 590.

Synthesis of Graft Polymer G3

Graft Polymer G3 was obtained in the same manner as in the synthesis of Graft Polymer G 1 in Example 4, except that, in place of 30 parts as solid content, of Macromonomer M1, 6 parts of acrylic acid, 52 parts of benzyl acrylate and 12 parts of n-butyl-α-(hydroxyethyl) acrylate used therein, the following synthesizing materials were used. That is, Graft Polymer G3 was obtained in the same manner as in Example 4 except that 28 parts as solid content, of the above Macromonomer M3, 12 parts of ethyl acrylate, 56 parts of benzyl methacrylate and 4 parts of ethyl-α-(hydroxymethyl) acrylate were used. This Graft Polymer G3 had a weight average molecular weight of 6,800 and an acid value of 183 mgKOH/g.

Preparation of Fluid Pigment Dispersion PK6

Fluid Pigment Dispersion PK6 was obtained in the same manner as in Example 2 except that, in the preparation of Fluid Pigment Dispersion PK2 in Example 2, Graft Polymer G3 obtained as described above was used in place of Random Polymer R2.

Preparation of Fluid Pigment Dispersions PC6, PM6 & PY6

Fluid Pigment Dispersions PC6, PM6 and PY6 were obtained in the same manner as in the preparation of Fluid Pigment Dispersion PK6 except that the carbon black (COLOR BLACK FW18, available from Degussa Corp.) used therein was changed for the following pigments, respectively. That is, C.I. Pigment Blue 15:3 was used to prepare Fluid Pigment Dispersion PC6, C.I. Pigment Red 122 was used to prepare Fluid Pigment Dispersion PM6 and C.I. Pigment Yellow 74 was used to prepare Fluid Pigment Dispersion PY6.

Preparation of Pigment Inks K6, C6, M6 & Y6

Pigment Inks K6, C6, M6 and Y6 were obtained in the same manner as in Example 2 except that, in the preparation of Pigment Ink K2 in Example 2, Fluid Pigment Dispersions PK6, PC6, PM6 and PY6, respectively, were used in place of Fluid Pigment Dispersion PK2.

Comparative Example 1

Preparation of Pigment Ink K7

The following components were mixed to prepare Pigment Ink K7.

| | |
|---|---|
| Fluid Pigment Dispersion PK1 | 30 parts |
| Glycerol | 5 parts |
| Diethylene glycol | 5 parts |
| Isopropyl alcohol | 5 parts |
| ACETYLENOL EH | 1 part |
| (available from Kawaken Fine Chemicals Co., Ltd.) | |
| Ion-exchanged water | 54 parts |

Preparation of Pigment Inks C7, M7 & Y7

Pigment Inks C7, M7 and Y7 were obtained in the same manner as in the preparation of Pigment Ink K7 except that Fluid Pigment Dispersions PC1, PM1 and PY1, respectively, were used in place of Fluid Pigment Dispersion PK1.

Evaluation

Test on Storage Stability of Inks

The respective-color inks of Examples and Comparative Example, prepared as described above, were each evaluated on their storage stability in the following way. The inks Pigment Inks K1 to K7, C1 to C7, M1 to M7 and Y1 to Y7 were each put into a 100 ml inner-volume container made of polyethylene, in an amount of 50 ml each, and were stored at 70° C. for 3 months. Then, these inks were measured for their pigment particle diameter in ink and viscosity of ink before and after the storage. Rates of changes in values of these before and after the storage were determined to evaluate their storage stability according to the following criteria. Test results obtained are shown in Tables 1 to 4 for each kind of the pigments used in the inks. Here, the rates of changes in particle diameter and viscosity were each found by multiplying by 100 what was found when a value which was relatively larger was divided by a value which was relatively smaller. Those in which the values decreased after the storage are shown by minus signs.

AA: The rates of changes in particle diameter and viscosity are both less than 5%.

A: The rates of changes in particle diameter and viscosity are both less than 10%, and either of the rates of changes in particle diameter and viscosity is 5% or more.

C: Either of the rates of changes in particle diameter and viscosity is 10% or more.

TABLE 1

Black Ink (pigment: carbon black)

| | Particle diameter | | Rate of change in particle diam. (%) | Ink viscosity | | Rate of change in viscosity (%) | Storage stability |
|---|---|---|---|---|---|---|---|
| | Before storage (nm) | After storage (nm) | | Before storage (mPa·s) | After storage (mPa·s) | | |
| Example: | | | | | | | |
| 1 | 92 | 101 | 9.8 | 2.53 | 2.76 | 9.1 | A |
| 2 | 97 | 105 | 8.2 | 2.58 | 2.74 | 6.2 | A |
| 3 | 99 | 106 | 7.1 | 2.62 | 2.72 | 3.8 | A |
| 4 | 103 | 108 | 4.9 | 2.59 | 2.65 | 2.3 | AA |

TABLE 1-continued

Black Ink (pigment: carbon black)

| | Particle diameter | | Rate of change in particle diam. (%) | Ink viscosity | | Rate of change in viscosity (%) | Storage stability |
|---|---|---|---|---|---|---|---|
| | Before storage (nm) | After storage (nm) | | Before storage (mPa·s) | After storage (mPa·s) | | |
| 5 | 109 | 113 | 3.7 | 2.68 | 2.57 | −4.1 | AA |
| 6 | 116 | 115 | −0.9 | 2.64 | 2.60 | −1.5 | AA |
| Comparative Example: | | | | | | | |
| 1 | 92 | 122 | 32.6 | 2.50 | 3.34 | 33.6 | C |

TABLE 2

Cyan Ink (pigment: C.I. Pigment Blue 15:3)

| | Particle diameter | | Rate of change in particle diam. (%) | Ink viscosity | | Rate of change in viscosity (%) | Storage stability |
|---|---|---|---|---|---|---|---|
| | Before storage (nm) | After storage (nm) | | Before storage (mPa·s) | After storage (mPa·s) | | |
| Example: | | | | | | | |
| 1 | 124 | 134 | 8.1 | 2.38 | 2.61 | 9.7 | A |
| 2 | 123 | 132 | 7.3 | 2.33 | 2.52 | 8.2 | A |
| 3 | 127 | 136 | 7.1 | 2.39 | 2.57 | 7.5 | A |
| 4 | 134 | 142 | 6.0 | 2.42 | 2.57 | 6.2 | A |
| 5 | 142 | 147 | 3.5 | 2.48 | 2.42 | −2.4 | AA |
| 6 | 147 | 149 | 1.4 | 2.46 | 2.49 | 1.2 | AA |
| Comparative Example: | | | | | | | |
| 1 | 127 | 139 | 9.4 | 2.38 | 2.75 | 15.5 | C |

TABLE 3

Magenta Ink (pigment: C.I. Pigment Red 122)

| | Particle diameter | | Rate of change in particle diam. (%) | Ink viscosity | | Rate of change in viscosity (%) | Storage stability |
|---|---|---|---|---|---|---|---|
| | Before storage (nm) | After storage (nm) | | Before storage (mPa·s) | After storage (mPa·s) | | |
| Example: | | | | | | | |
| 1 | 120 | 131 | 9.2 | 2.32 | 2.54 | 9.5 | A |
| 2 | 127 | 138 | 8.7 | 2.40 | 2.61 | 8.8 | A |
| 3 | 132 | 142 | 7.6 | 2.36 | 2.54 | 7.6 | A |
| 4 | 135 | 145 | 7.4 | 2.48 | 2.65 | 6.9 | A |
| 5 | 141 | 149 | 5.7 | 2.42 | 2.49 | 2.9 | A |
| 6 | 139 | 141 | 1.4 | 2.47 | 2.43 | −1.6 | AA |
| Comparative Example: | | | | | | | |
| 1 | 128 | 142 | 10.9 | 2.38 | 2.66 | 11.8 | C |

TABLE 4

| | Particle diameter | | Rate of change in particle diam. (%) | Ink viscosity | | Rate of change in viscosity (%) | Storage stability |
|---|---|---|---|---|---|---|---|
| | Before storage (nm) | After storage (nm) | | Before storage (mPa·s) | After storage (mPa·s) | | |
| Yellow Ink (pigment: C.I. Pigment Yellow 74) | | | | | | | |
| Example: | | | | | | | |
| 1 | 128 | 140 | 9.4 | 2.24 | 2.46 | 9.8 | A |
| 2 | 131 | 143 | 9.2 | 2.21 | 2.40 | 8.6 | A |
| 3 | 130 | 140 | 7.7 | 2.26 | 2.43 | 7.5 | A |
| 4 | 134 | 141 | 5.2 | 2.20 | 2.37 | 7.7 | A |
| 5 | 135 | 138 | 2.2 | 2.23 | 2.35 | 5.4 | A |
| 6 | 138 | 139 | 0.7 | 2.29 | 2.37 | 3.5 | AA |
| Comparative Example: | | | | | | | |
| 1 | 126 | 149 | 18.3 | 2.22 | 2.74 | 23.4 | C |

As shown in Tables 1 to 4, the inks of Examples 1 to 6 all less changed in particle diameter and viscosity as a result of the storage, and were found to have high storage stability. Especially in Example 6, it was ascertained that all the inks had a high storage stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-162272, filed Jun. 12, 2006 which is hereby incorporated by reference herein in its entirety.

What is claimed is:

1. An ink-jet recording pigment ink comprising:
a pigment;
water;
a water-soluble solvent; and
a polymer,
wherein the polymer is obtained by polymerizing an alkyl-α-(hydroxyalkyl) acrylate monomer represented by the following formula (1):

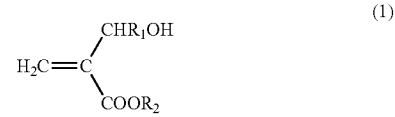

(1)

wherein $R_1$ represents a hydrogen atom or an alkyl group having 1 to 4 carbon atoms,
wherein $R_2$ is selected from the group consisting of a straight-chain or branched alkyl group having 1 to 18 carbon atoms, a cycloalkyl group having 4 to 6 carbon atoms, and a phenyl group,
wherein the polymer is a graft polymer, and
wherein the graft polymer has a hydrophobic main chain and a hydrophilic side chain.

2. The ink-jet recording pigment ink according to claim 1, wherein the polymer is a pigment-dispersing agent.

3. The ink-jet recording pigment ink according to claim 1, wherein the main chain of the graft polymer is obtained by polymerizing the alkyl-α-(hydroxyalkyl) acrylate monomer.

* * * * *